(12) United States Patent
Syfko (10) Patent No.: US 11,084,232 B2
(45) Date of Patent: *Aug. 10, 2021

(54) GLAZING PANEL REPAIR

(71) Applicant: Belron International Limited, Egham (GB)

(72) Inventor: Paul Syfko, Westerville, OH (US)

(73) Assignee: Belron International Limited, Egham (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/430,998

(22) Filed: Jun. 4, 2019

(65) Prior Publication Data

US 2019/0291366 A1 Sep. 26, 2019

Related U.S. Application Data (62) Division of application No. 14/917,328, filed as application No. PCT/EP2014/069823 on Sep. 17, 2014, now Pat. No. 10,350,841.

(30) Foreign Application Priority Data

Sep. 20, 2013 (GB) ..................... 1316736

(51) Int. Cl.
- *B29C 73/02* (2006.01)
- *B32B 17/10* (2006.01)
- *B29L 31/00* (2006.01)
- *B29L 31/30* (2006.01)

(52) U.S. Cl.
CPC ...... *B29C 73/025* (2013.01); *B32B 17/10963* (2013.01); *B29L 2031/3052* (2013.01); *B29L 2031/7782* (2013.01)

(58) Field of Classification Search
CPC .......... B29C 73/02; B29C 73/025; B29L 2031/3052; B29L 2031/778; B29L 2031/7782; B29L 2031/7728; B32B 17/10963

See application file for complete search history.

(56) References Cited

U.S. PATENT DOCUMENTS

| | | |
|---|---|---|
| 4,047,863 A | 9/1977 | McCluskey et al. |
| 4,132,516 A | 1/1979 | Story |
| 4,280,861 A | 7/1981 | Schwartz |
| 4,776,780 A | 10/1988 | Banks |
| 4,820,148 A | 4/1989 | Anderson |
| 4,826,413 A | 5/1989 | Matles |

(Continued)

FOREIGN PATENT DOCUMENTS

| | | |
|---|---|---|
| DE | 36 41 416 A1 | 6/1988 |
| TW | 486437 B | 5/2002 |

(Continued)

OTHER PUBLICATIONS

International Search Report of Application No. PCT/EP2014/069823 dated Dec. 16, 2014.

*Primary Examiner* — Michael A Tolin
(74) *Attorney, Agent, or Firm* — Gordon & Jacobson, P.C.

(57) ABSTRACT

A glazing panel repair device (1) has coupling means (27) for coupling a pump arrangement (22) to the device to provide holding suction to secure the device to the glazing panel and presume cycling to a repair zone. In one embodiment the coupling means is for coupling a single pump to provide holding suction to secure the device to the glazing panel and pressure cycling to a repair zone.

14 Claims, 9 Drawing Sheets

(56) References Cited

U.S. PATENT DOCUMENTS

| | | | |
|---|---|---|---|
| 5,073,224 A | 12/1991 | Addison | |
| 5,156,853 A | 10/1992 | Werner et al. | |
| 5,591,460 A | 1/1997 | Wanstrath et al. | |
| 6,485,281 B1 | 11/2002 | Curl | |
| 6,589,036 B1 | 7/2003 | Rawlins | |
| 9,688,031 B2 | 6/2017 | Hauser | |
| 10,350,841 B2 | 7/2019 | Syfko | |
| 2005/0238743 A1 | 10/2005 | Wanstrath | |

FOREIGN PATENT DOCUMENTS

| | | |
|---|---|---|
| WO | WO89/07064 A1 | 8/1989 |
| WO | WO91/01883 A1 | 2/1991 |
| WO | WO01/34373 A1 | 5/2001 |

GLAZING PANEL REPAIR

CROSS-REFERENCE TO RELATED APPLICATIONS

This application is a divisional of U.S. application Ser. No. 14/917,328, filed on Mar. 8, 2016, now U.S. Pat. No. 10,350,841, which is the National Stage of International Patent Application No. PCT/EP2014/069823 filed on Sep. 17, 2014, which claims priority from British Patent Application No. GB 1316736.6 filed on Sep. 20, 2013, all of which are hereby incorporated by reference herein in their entireties.

BACKGROUND

1. Field

The present invention relates to a device and method for glazing panel repair, particularly but not exclusively to a device and a method for repairing vehicle glazing panels.

2. State of the Art

Existing apparatus and methods for repairing damaged vehicle glazing panels are known. One such system is disclosed, for example, in EP1227927. In the arrangement described, a repair device is secured to the vehicle glazing panel using suction applied via a suction pump the suction pump also acts on the repair zone to provide a partial vacuum. A piston is manually movable to close a poppet valve and enable an 'enhanced vacuum' to be applied and allow for positive pressure cycling. The device applies liquid repair resin to the damaged zone of the glazing panel and the vacuum and pressure cycling causes de-gassing and complete infilling of the damage and resin.

Problems arise in using the apparatus and technique as disclosed in EP1227927, not least of which include the requirement for frequent maintenance of the apparatus and also the requirement for a relatively high degree of operator skill in using the apparatus.

SUMMARY

An improved arrangement has now been devised.

According to the present invention, there is provided a glazing panel repair device, the device comprising coupling means for coupling a pump arrangement to the device to provide:
 i) holding suction to secure the device to the glazing panel; and
 ii) ii) pressure cycling to a repair zone.

It is preferred that the coupling means is for coupling a pump arrangement comprising a single pump to provide holding suction to secure the device to the glazing panel and pressure cycling to a repair zone. A single pump with both a pressure port and a suction/vacuum port is preferred for this purpose.

Accordingly, the device preferably is provided with just a single pneumatic line connector for coupling the pump arrangement to the device.

It is preferred that the device comprises a manifold or duct arrangement communicating between the coupling means and i) a securing zone to apply suction to secure the device to the glazing panel and ii) the repair zone.

The manifold or duct arrangement preferably comprises separate branches communicating with the securing zone and the repair zone.

Beneficially, a check valve is provided to inhibit loss of suction applied at the securing zone.

The device preferably includes a pressure relief valve for releasing suction applied at the securing zone. It is preferred that the pressure relief valve is manually actuatable. The pressure relief valve may be provided on the side of the device and is separate from the check valve.

In one embodiment it is preferred that the securing zone comprises an annular zone surrounding the repair zone.

The securing zone and repair zone are beneficially provided on a body of the device that is held against the glazing panel during use.

The securing zone is arranged to be sealed from the repair zone when the device is in use.

It is preferred that the device comprises a repair fluid reservoir, or a dock for such a reservoir.

The reservoir or dock is typically in communication with the repair zone.

Means is preferably provided for opening the repair fluid reservoir.

In one embodiment it is preferred that the device comprises a dock for a repair fluid reservoir in the form of a rupture-able container, and the device (typically the dock) is provided with means (such as a rupture spike) for rupturing the rupture-able container.

In one embodiment the repair fluid is carried in or by a plunger which travels along a bore in the body of the device.

The device is preferably provided with a controller programmed to operate the pump according to a pre-set operational procedure.

According to a further aspect the invention provides a method of repairing glazing panel damage, wherein a pump arrangement (preferably the same single pump) is used to both:
 i) provide suction to secure a repair device to the glazing panel; and,
 ii) ii) provide pressure cycling via the device at a repair zone.

According to a further aspect, the invention provides a glazing panel repair device, the device comprising coupling means for coupling a pump arrangement, and a fluid flow path communicating between the coupling means and a securing zone to apply suction to secure the device to the glazing panel and wherein a one way check valve is provided to hold vacuum at the securing zone; the vacuum being released by actuation of a separate relief valve provided on board the device, and wherein the device is provided with means for providing positive pressure and/or vacuum (suction) at a repair zone.

According to this aspect, it is preferred that the device is provided with means for providing both positive pressure and vacuum (suction) at the repair zone.

According to a further aspect, the present invention provides a method of repairing glazing panel damage, wherein a powered pneumatic pump arrangement is used to provide pressure cycling (positive pressure alternating with vacuum suction) via a repair device secured to the glazing panel at a repair zone.

Beneficially, control means controls the pressure cycling applied by the pump arrangement.

A plurality of cycles of pressure and vacuum suction are preferably applied, preferably when the repair fluid has been delivered to the repair zone.

BRIEF DESCRIPTION OF THE DRAWINGS

The invention will now be further described by way of example and with reference to the accompanying drawings.

DETAILED DESCRIPTION

Figure 1:
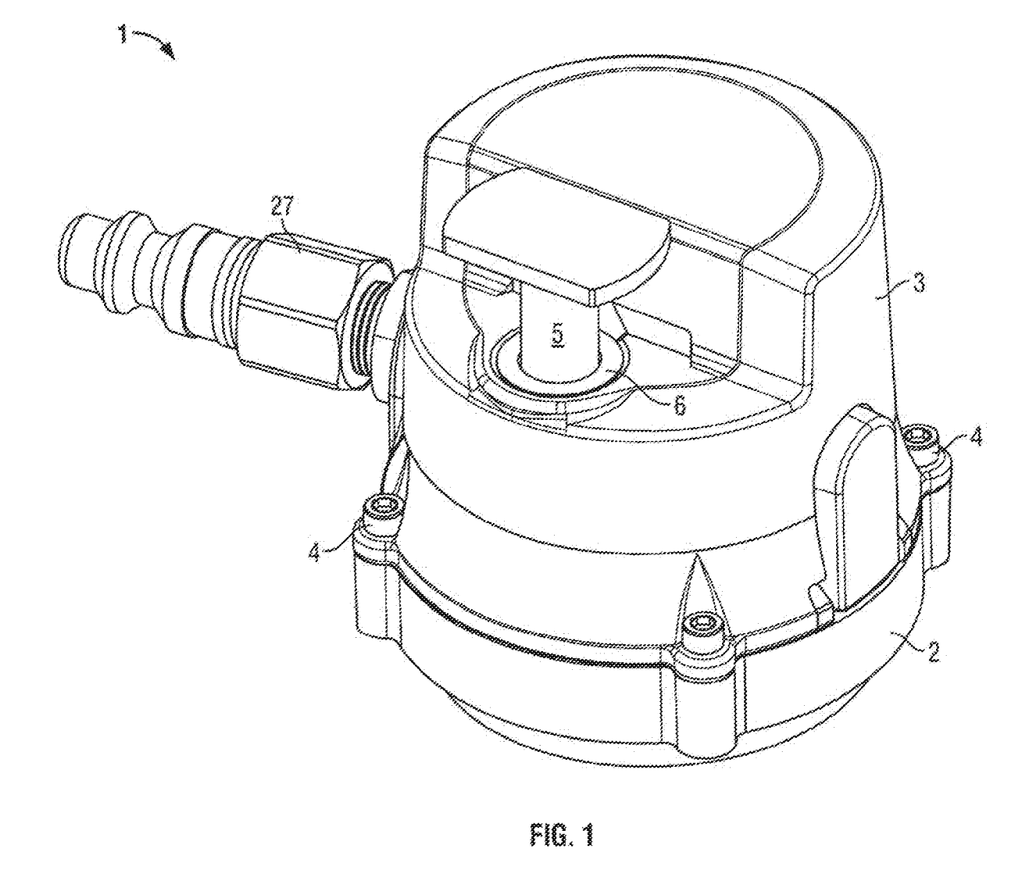
FIG. 1 is a perspective view of an exemplary glazing panel repair device in accordance with the invention.
Figure 2:
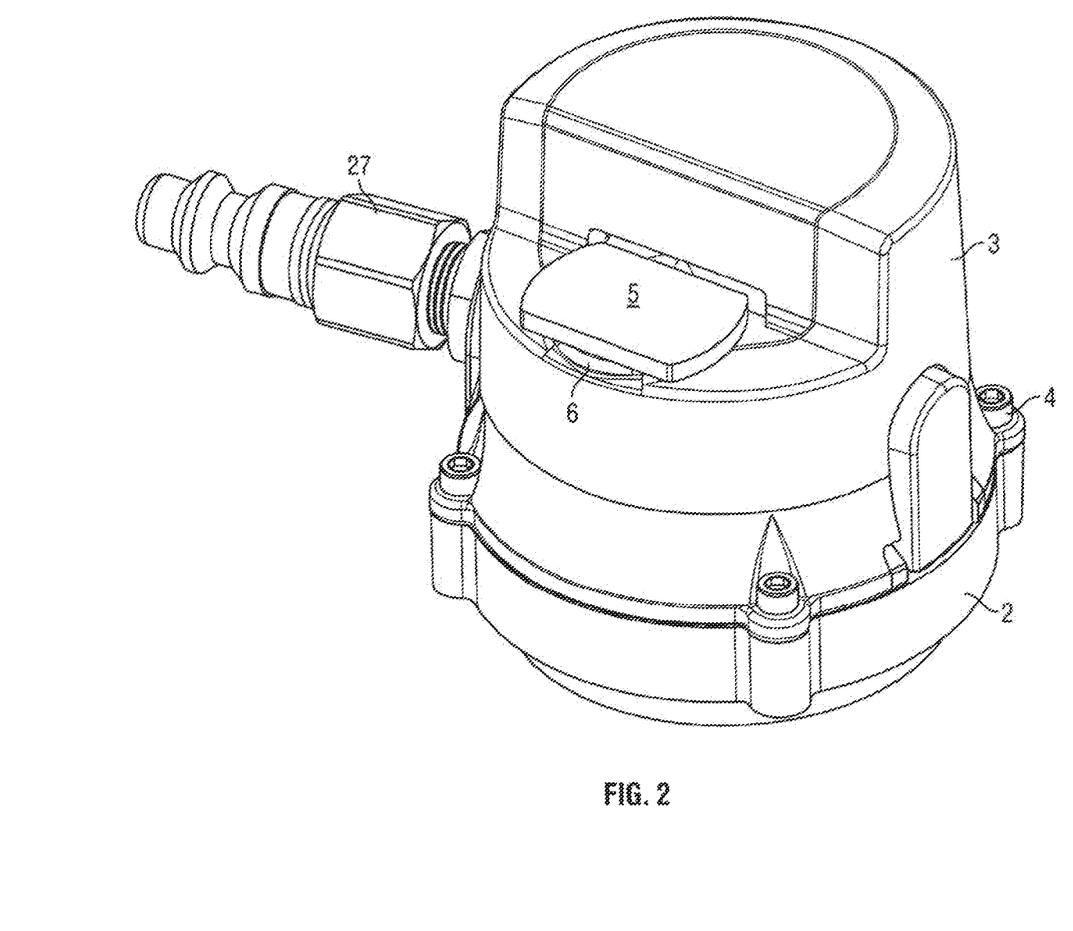
FIG. 2 is a similar view to the view of FIG. 1 but with the plunger in the fully pressed down position.

Referring to the drawings there is shown a glazing panel repair device 1 comprising a body 2 to which is secured a cap 3 by means of securing bolts 4. The cap 3 and body 2 are formed of moulded plastics material. A repair resin delivery plunger 5 is shown in FIGS. 1 and 2 positioned in a receiving tube (or dock) 6, the operation of which will be described in detail later. The resin plunger 5 carries a rupture-able vial or capsule of repair resin. A vacuum/pressure coupling 27 is also shown arranged to couple with a single pneumatic line 26 to deliver suction and/or positive pneumatic pressure to the device 1 from a vacuum/pressure pump 22 (FIG. 8) remote from the device 1.

Figure 3:
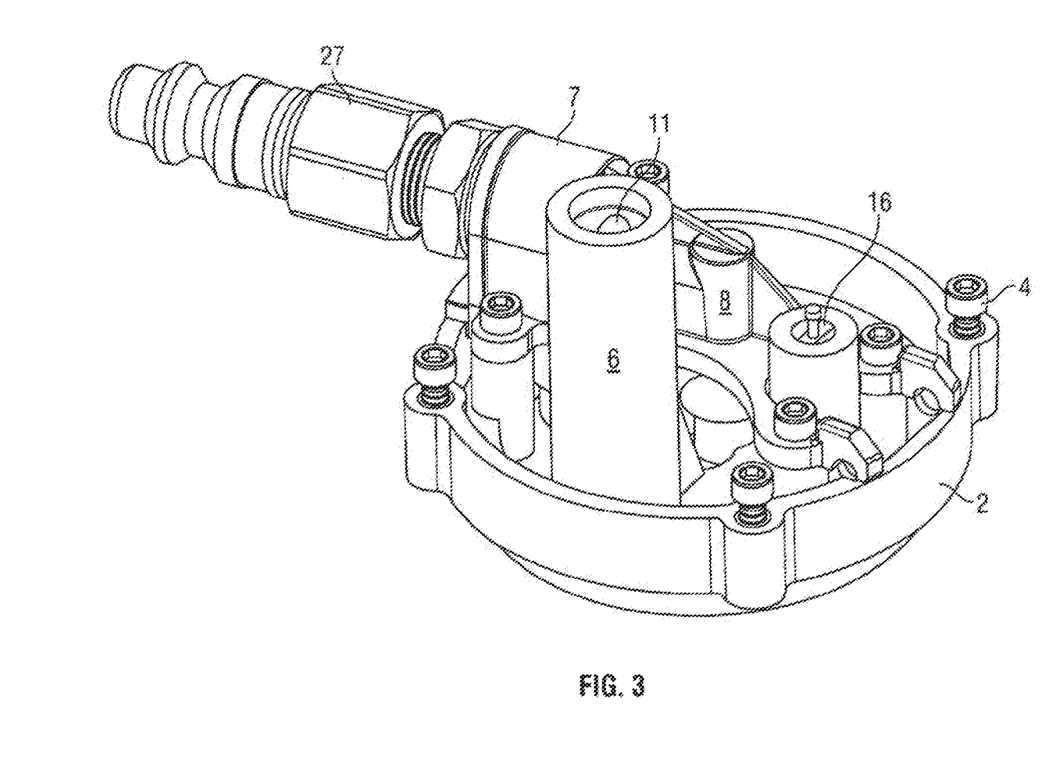
FIG. 3 is a view of the device with the cap 3 removed.
Figure 4:
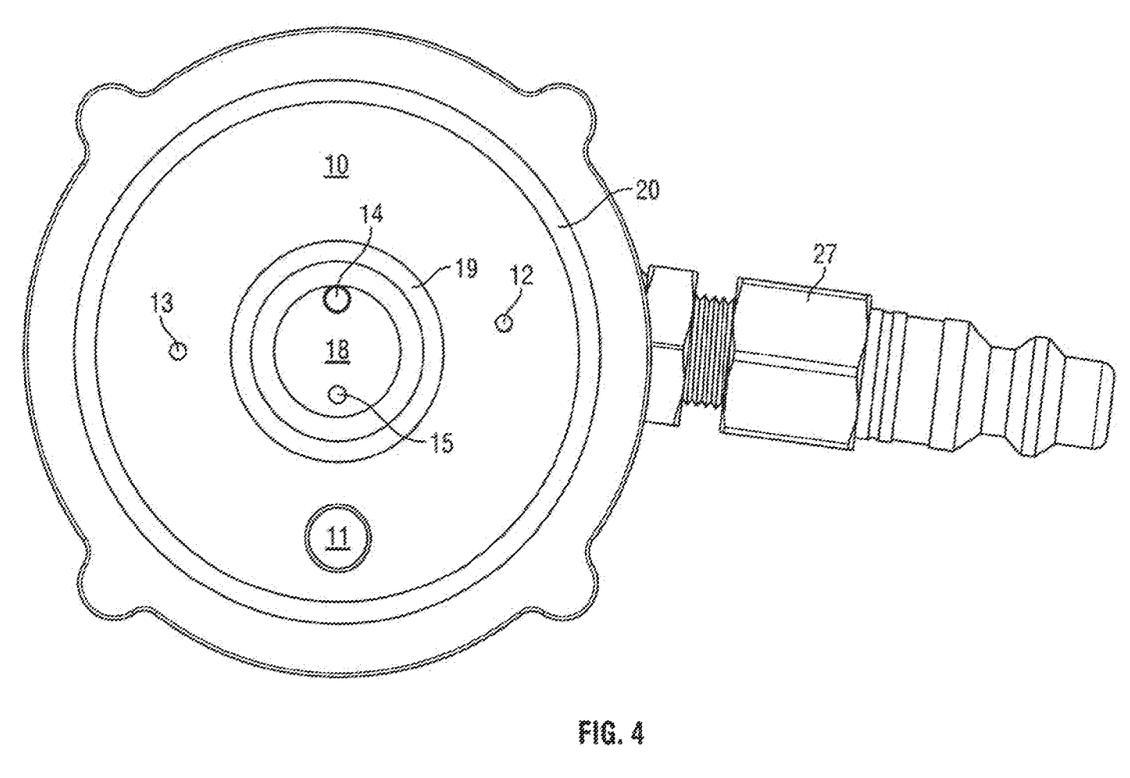
FIG. 4 is a view of the underside of the device.
Figure 5:
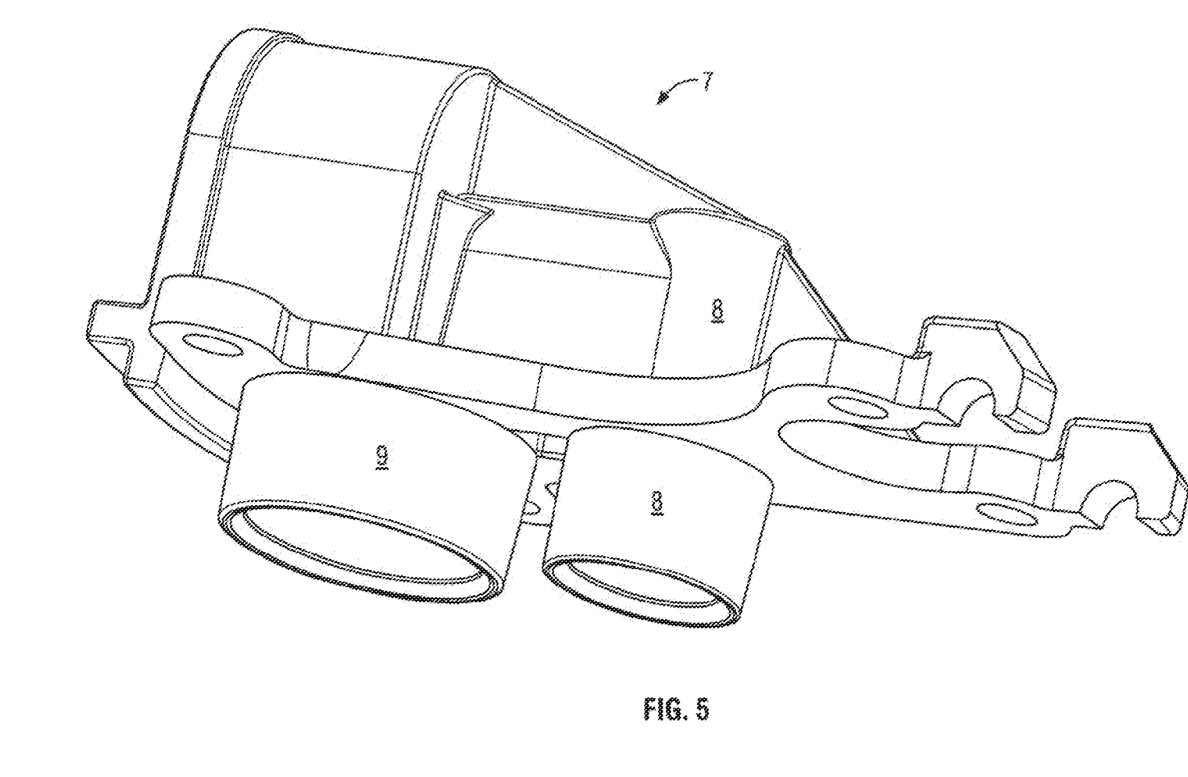
FIG. 5 is a perspective view of the manifold of the device.
Figure 6:
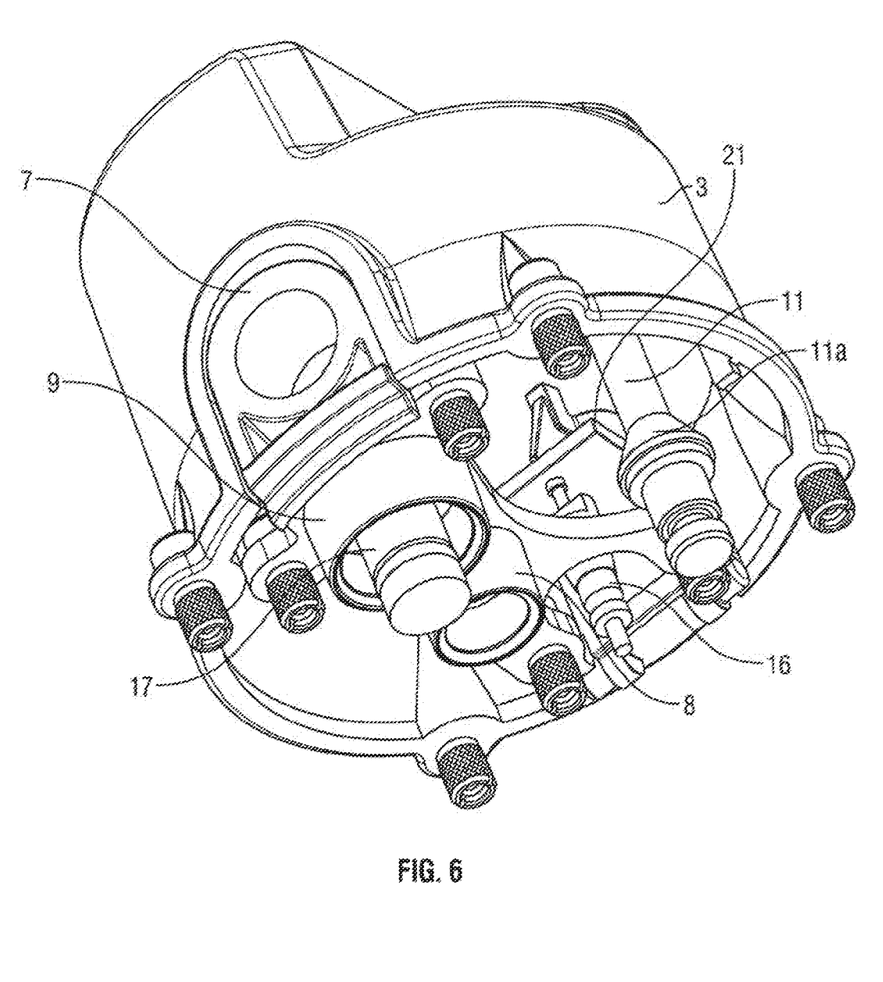
FIG. 6 is a view of the components of the device with the body removed for explanatory purposes.

FIG. 1 shows the cap in position secured to the body 2. A corresponding view is shown in FIG. 3 with the cap 3 and resin plunger 5 removed from view. A vacuum/pressure coupling 27 is shown in the drawings connecting with a manifold 7 which delivers either vacuum or applied pressure to separate defined zones on the underside of the device, via separate limbs 8,9 of the manifold. Referring to FIG. 4 the underside of the device is shown. This is the part of the device that is on use pressed against the surface of the glazing panel to be repaired. An outer annular suction zone 10 is provided between inner circumferential rib 19 and outer circumferential rib 20. Vacuum is supplied via the check valve 17 to the securing zone vacuum port 12 in order to apply suction to secure the device 1 to the glazing panel. A relief port 13 communicates with a relief valve 16 to permit the suction in the outer annular suction zone 10 to be relieved. The inner circumferential rib 19 and outer circumferential rib 20 project outwardly from the planar surface of the underside of the device. They contact the glazing panel and hold the planar surface of the underside of the device a little away from the surface of the glazing panel. This defines the repair zone and suction zone in the space immediately adjacent the underside of the device.

The vacuum/applied pressure is delivered to the outer annular suction zone 10 via branch 9 of the manifold connector which contains the one way check valve 17. The vacuum/applied pressure is delivered to the inner repair zone 18 via branch 8 of the manifold connector and to the inner zone at the repair region by means of a manifold connector.

Figure 7:
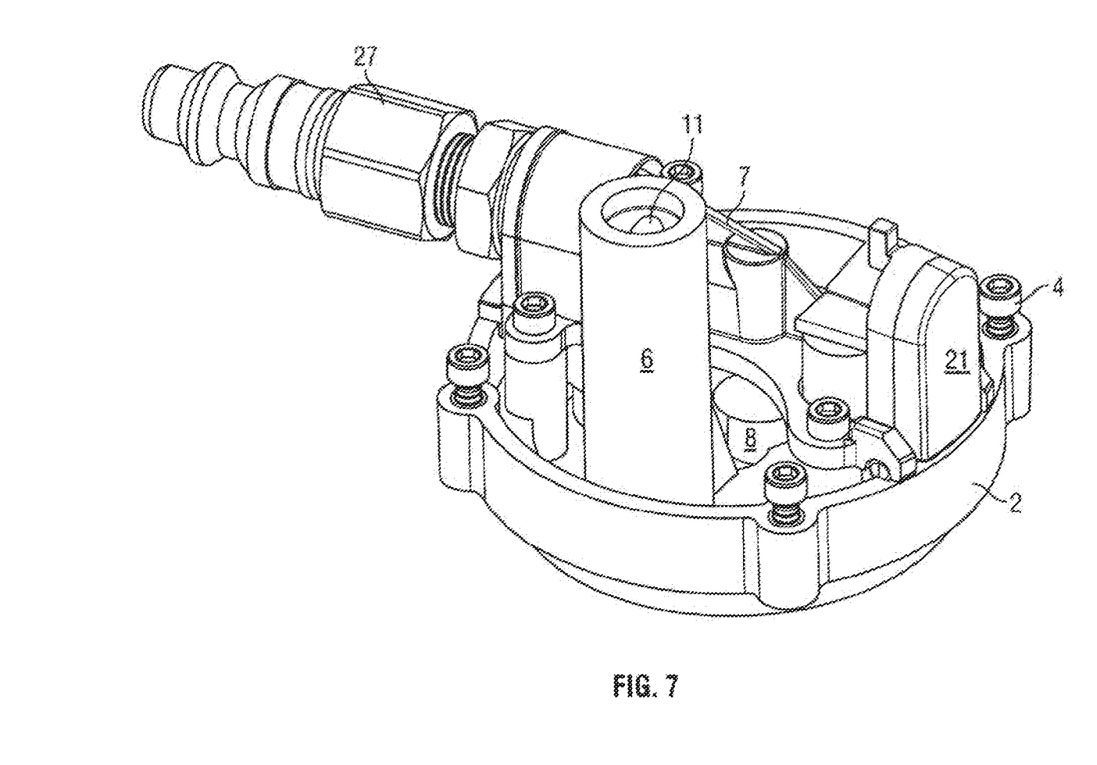
FIG. 7 is a view similar to the view of FIG. 3 but with the relief actuator button shown.

The relief port 13 communicates with the relief valve 16 (which may for example comprise a Prestia relief valve). The relief port 13 is actuated by means of a pivotally mounted relief actuator button 21 provided on the exterior of the device. The relief actuator button 21 pivots around pivot formations and an inclined wedge acting portion 21a of the relief actuator button 21 acts on the release actuator of the prestia valve.

Internally of the annular housing which forms the resin plunger dock is provided a spike 11 which is arranged to pierce the resin capsule held within the interior cavity of the plunger 5. When pierced the liquid repair resin runs down the length of the spike 11 and is distributed by the flange 11a and a duct 6a to the resin port 15 and then the repair zone 18.

These are substantially all the components of the device, which ensures it is relatively inexpensive and simple to manufacture and does not require maintenance but rather can be made to be substantially disposable as the body and cap are made of plastics material.

Figure 8:
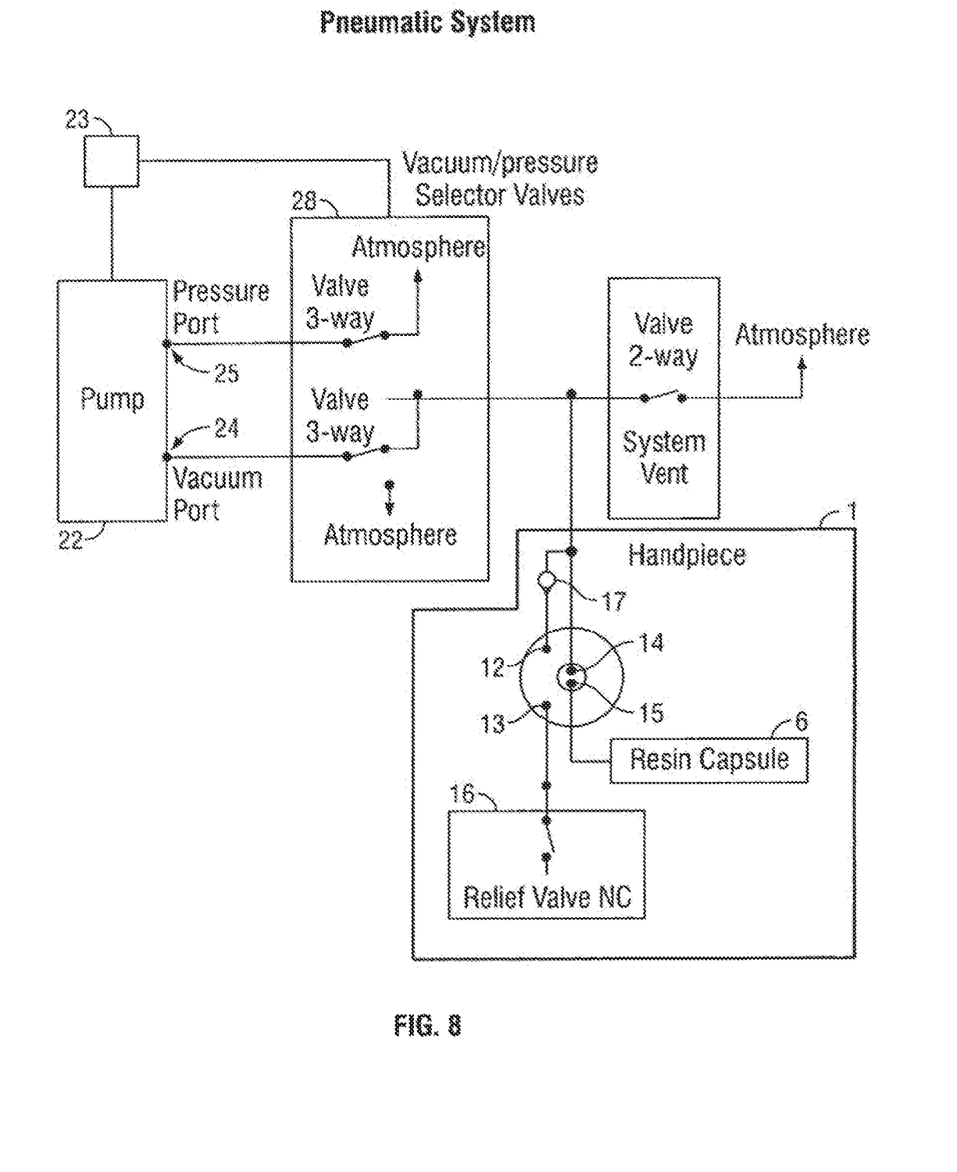
FIG. 8 is a view of an exemplary pneumatic system incorporating the device.
Figure 9:
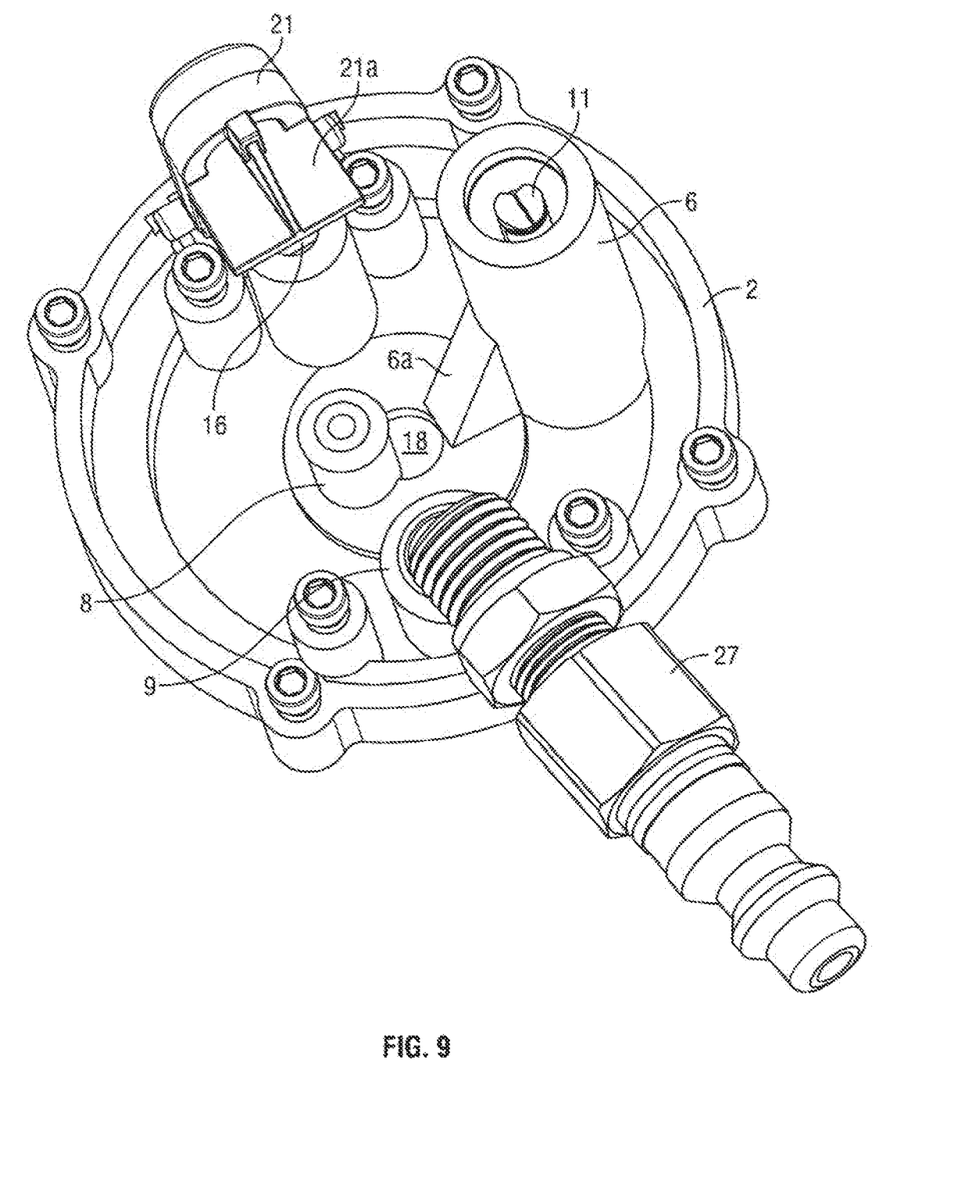
FIG. 9 is a view of the body and manifold connectors from above.

The device is used in combination with a pneumatic pump 22 and a programmable controller 23. A system diagram is shown in FIG. 8. The pneumatic pump 22 has both a vacuum (suction) port 24 and a pressure port 25.

In operation a single pneumatic line 26 exiting from the control valve unit 28 is connected to the line connector coupling 27. The control valve unit 28, under operation of the controller, dictates whether suction (vacuum) or positive pressure is applied via the pneumatic line 26. Initially a securing vacuum is applied and this is set up in the outer annular suction zone 10 via the check valve 17. The check valve 17 ensures the vacuum cannot be released other than by means of activation of the relief valve 16. Vacuum is also applied via the manifold to the central inner repair zone 18 at the region of the break. This aids in de-gassing the break prior to application of the resin.

Subsequently the resin is applied, as in the prior art by pushing the plunger 5 downwardly to fracture the resin capsule on the spike 11 positioned within the central upright cylinder of the 6. The resin flows via the internal passageways defined in the main body, via the resin port 15 to the region of the break where it in-fills the break.

The pump is at this point typically operated in suction mode to de-gas the resin and draw it into the repair zone.

Next the pump is operated to pressure cycle the damaged glass and in filling resin material by means of cycling applied vacuum applied positive pressure in a regime that can be tailored by trial and error for optimum results. This ensures that the resin completely fills the break and the resin is de-gassed to a maximum extent. A preferred regime is detailed later in this description. Using a powered pneumatic pump provides that sufficiently high positive pressure and low vacuum pressure can be applied for significant duration typically 30 seconds or more for each part of the cycle.

During the positive and negative pressure cycling the device is held firmly on the glazing panel by means of the previously applied vacuum in the outer annular suction zone 10.

Subsequent to operation the device can be removed by means of releasing the prestia relief valve 16 via the relief actuator button 21. The pneumatic pump 22 can then be switched off.

Typically the application of pressure and the entire operational cycle is controlled by a programmed controller which arranges the duration and operation of the various positive and negative pressure periods in the operational cycle.

A typical process cycle is as follows:

Vacuum=22 in Hg

Pressure=25 psi

Primer/Dry-out stage:

Vacuum-180 sec

Repair Stages:
Initial Vacuum=30 sec
Break Capsule=15 sec
Initial Pressure=60 sec
Rapid Sequences—
Stage 1
Vac #1=30 sec
Pressure #1=30 sec
Stage 2
Vac #2=30 sec
Pressure #2=30 sec
Stage 3
Vac #3=30 sec
Pressure #3=30 sec
Stage 4
Vac #4=30 sec
Pressure #4=30 sec
Stage 5
Vac #5=30 sec
Pressure #5=30 sec
Stage 6
Vac #6=30 sec
Pressure #6=45 sec It will be clear that certain features of the device 1 and operation cycling whilst preferred are not essential to the essence of the invention. For example other configurations of flow-paths and manifolds could be employed. The invention provides advantages over the prior art in that pressure cycling can be achieved automatically without significant intervention by the user. In this scenario user intervention is only envisaged at the point at which the plunder is pushed in. The skilled addressee will realise that there is also potential for this step to be automated.

The application of pressure can be supplied from a single pump or separate pumps could be utilised. The former is particularly beneficial but the latter still provides a benefit over the prior art that the pressure cycling can be automated and controlled.

The invention claimed is:

1. A device for repairing a glazing panel, the device comprising:
   a solitary vacuum pressure coupling for a single pneumatic line, the solitary vacuum pressure coupling being the only connection for the device to a pump to provide:
   i) holding suction to a suction zone in order to secure the device to the glazing panel; and
   ii) pressure cycling to a repair zone;
   the device further comprising:
   a device body to which the solitary vacuum pressure coupling is mounted;
   a first rib disposed on an underside of the device body, wherein the first rib defines a perimeter of the suction zone; and
   a second rib disposed on the underside of the device body, wherein the second rib defines a perimeter of the repair zone;
   wherein the vacuum pressure coupling communicates with a manifold formed in the device body and which communicates via a first branch formed in the device body and a second branch formed in the device body, wherein one of the first branch and the second branch communicates with the repair zone and the other of the first branch and the second branch communicates with the suction zone.

2. The device according to claim 1, wherein the pump comprises a single pump.

3. The device according to claim 1, further comprising a check valve to inhibit loss of suction applied at the suction zone.

4. The device according to claim 1, further comprising a pressure relief valve for releasing suction applied at the suction zone.

5. The device according to claim 4, wherein the pressure relief valve is manually actuatable.

6. The device according to claim 4, further comprising a check valve that is separate from the pressure relief valve.

7. The device according to claim 1, wherein the first rib surrounds the second rib such that the suction zone surrounds the repair zone.

8. The device according to claim 1, wherein the suction zone is sealed from the repair zone when the device is in use.

9. The device according to claim 1, wherein the device comprises a repair fluid reservoir, or a dock therefor.

10. The device according to claim 9, wherein the repair fluid reservoir or dock is in communication with the repair zone.

11. The device according to claim 10, further comprising means for opening the repair fluid reservoir.

12. The device according to claim 9, further comprising a plunger that carries a repair fluid, wherein the plunger travels along a bore in the body of the device.

13. The device according to claim 1, further comprising a dock for a repair fluid reservoir in the form of a rupture-able container, and the device is provided with means for rupturing the rupture-able container.

14. The device according to claim 1, further comprising a control device programmed to operate the pump according to a pre-set operational procedure.

* * * * *